(12) United States Patent
Saito

(10) Patent No.: US 11,507,886 B2
(45) Date of Patent: Nov. 22, 2022

(54) VECTORIZATION OF STRUCTURED DOCUMENTS WITH MULTI-MODAL DATA

(71) Applicant: SAP SE, Walldorf (DE)

(72) Inventor: Sean Saito, Singapore (SG)

(73) Assignee: SAP SE, Walldorf (DE)

( * ) Notice: Subject to any disclaimer, the term of this patent is extended or adjusted under 35 U.S.C. 154(b) by 463 days.

(21) Appl. No.: 16/820,859

(22) Filed: Mar. 17, 2020

(65) Prior Publication Data
US 2021/0295200 A1   Sep. 23, 2021

(51) Int. Cl.
| | |
|---|---|
| *G06F 40/166* | (2020.01) |
| *G06N 20/00* | (2019.01) |
| *G06F 16/22* | (2019.01) |
| *G06Q 10/10* | (2012.01) |
| *G06V 30/416* | (2022.01) |
| *G06F 40/103* | (2020.01) |
| *G06Q 40/02* | (2012.01) |

(52) U.S. Cl.
CPC .......... *G06N 20/00* (2019.01); *G06F 16/221* (2019.01); *G06F 40/103* (2020.01); *G06Q 10/10* (2013.01); *G06V 30/416* (2022.01); *G06Q 40/02* (2013.01)

(58) Field of Classification Search
CPC .... G06N 20/00; G06N 3/0445; G06N 3/0481; G06N 3/0454; G06N 3/08; G06F 16/221; G06F 40/103; G06F 16/2465; G06Q 10/10; G06Q 40/02; G06V 30/416
See application file for complete search history.

(56) References Cited

U.S. PATENT DOCUMENTS

| | | | | |
|---|---|---|---|---|
| 2013/0262519 | A1* | 10/2013 | Diner | G06F 16/254 707/802 |
| 2018/0081947 | A1* | 3/2018 | Kass | G06F 16/2456 |
| 2019/0286943 | A1* | 9/2019 | Leskovec | G06K 9/6262 |
| 2020/0175360 | A1* | 6/2020 | Conti | G06V 10/82 |

OTHER PUBLICATIONS

Fei-Fei et al., "One-shot learning of object categories." IEEE transactions on pattern analysis and machine intelligence, 28.4, Apr. 2006, 18 pages.
Guo et al., "On calibration of modern neural networks." Proceedings of the 34th International Conference on Machine Learning—vol. 70. JMLR. org, Aug. 6, 2017, 14 pages.
(Continued)

*Primary Examiner* — Keith D Bloomquist
(74) *Attorney, Agent, or Firm* — Fish & Richardson P.C.

(57) ABSTRACT

Methods, systems, and computer-readable storage media for receiving structured data including a set of columns and a set of rows, determining, for each column, a column width defining a number of characters, providing, for each row, a set of padded values, each padded value corresponding to a column and including a value and one or more padding characters, the value and the one or more padding values collectively having a length equal to a respective column width, defining a set of strings by, for each row, concatenating padded values in the set of padded values to provide a string, and training the ML model by providing, for each string in the set of strings, an embedding as an abstract representation of a record of a respective row and processing the embedding through an attention layer of the ML model.

20 Claims, 5 Drawing Sheets

(56) References Cited

OTHER PUBLICATIONS

Janocha et al., "On loss functions for deep neural networks in classification." arXiv preprint arXiv:1702.05659, Feb. 18, 2017, 10 pages.
Lin et al., "Focal loss for dense object detection" Proceedings of the IEEE international conference on computer vision, 2017, 10 pages.
Parikh et al., "A decomposable attention model for natural language inference." arXiv preprint arXiv:1606.01933, Jun. 3, 2016, 7 pages.
Vaswani et al., "Attention is all you need." Advances in neural information processing systems, 2017, 12 pages.

* cited by examiner

VECTORIZATION OF STRUCTURED DOCUMENTS WITH MULTI-MODAL DATA

BACKGROUND

In general, machine learning includes training a machine learning (ML) model that receives input and provides some output. Machine learning can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

Despite the advent of advanced ML algorithms and frameworks, such as deep learning, there is comparatively little development in adapting ML to structured data. For example, a common problem in ML is the way in which data is to be represented. In natural language processing (NLP), characters, words, and sentences can be represented as vectors which are commonly referred to as embeddings. These abstract representations allow for deep neural networks to learn and understand the semantic relationships and patterns of textual data.

In structured documents, however, finding suitable vectorization strategies is more difficult. The main difference is that structured documents typically include multiple modalities (types) of data. For example, instead of a string of text, structured documents can include multiple columns of numbers, text, categories, and dates. In the example case of bank statements and customer accounts, documents can contain reference numbers, amounts, customer names, dates, and various free text fields that provide some description. Consequently, applying traditional ML models out-of-the-box fails to provide satisfactory performance of the ML models. This is because training of the ML model can result in bias.

SUMMARY

Implementations of the present disclosure are directed to vectorizing structured documents with multiple modalities to enable machine learning (ML) models to learn from the data more effectively and increase ML model performance. More particularly, implementations of the present disclosure are directed to a vectorization scheme for structured documents having multiple modalities, the vectorization scheme accounting for columns and column spacing within the structured documents to provide input vectors representative of data within the structured documents. Implementations of the present disclosure are also directed to combining the vectorization scheme with an attention mechanism that enables ML models to learn which part of the vector input are relevant for a prediction.

In some implementations, actions include receiving structured data including a set of columns and a set of rows, each column having a plurality of values, and each row representing a record including a set of values of the set of columns, determining, for each column, a column width defining a number of characters, providing, for each row, a set of padded values, each padded value corresponding to a column and including a value of the set of values and one or more padding characters, the value and the one or more padding values collectively having a length equal to a respective column width, defining a set of strings by, for each row, concatenating padded values in the set of padded values to provide a string, and training the ML model by providing, for each string in the set of strings, an embedding as an abstract representation of a record of a respective row and processing the embedding through an attention layer of the ML model. Other implementations of this aspect include corresponding systems, apparatus, and computer programs, configured to perform the actions of the methods, encoded on computer storage devices.

These and other implementations can each optionally include one or more of the following features: a first column in the set of columns includes values of a first data type and a second column in the set of columns includes values of a second data type, the second data type being different from the first data type; for a respective row, a first padded value is provided having a first number of characters and a second padded value is provided having a second number of characters, the second number of characters being different than the first number of characters; each embedding includes a zero vector as an abstract representation of a padding character; each embedding includes a non-zero vector as an abstract representation of a non-padding character; after training, the ML model is unbiased with respect to an order of columns; and the structured document includes data representative of bank statements that are to be matched to customer accounts by the ML model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
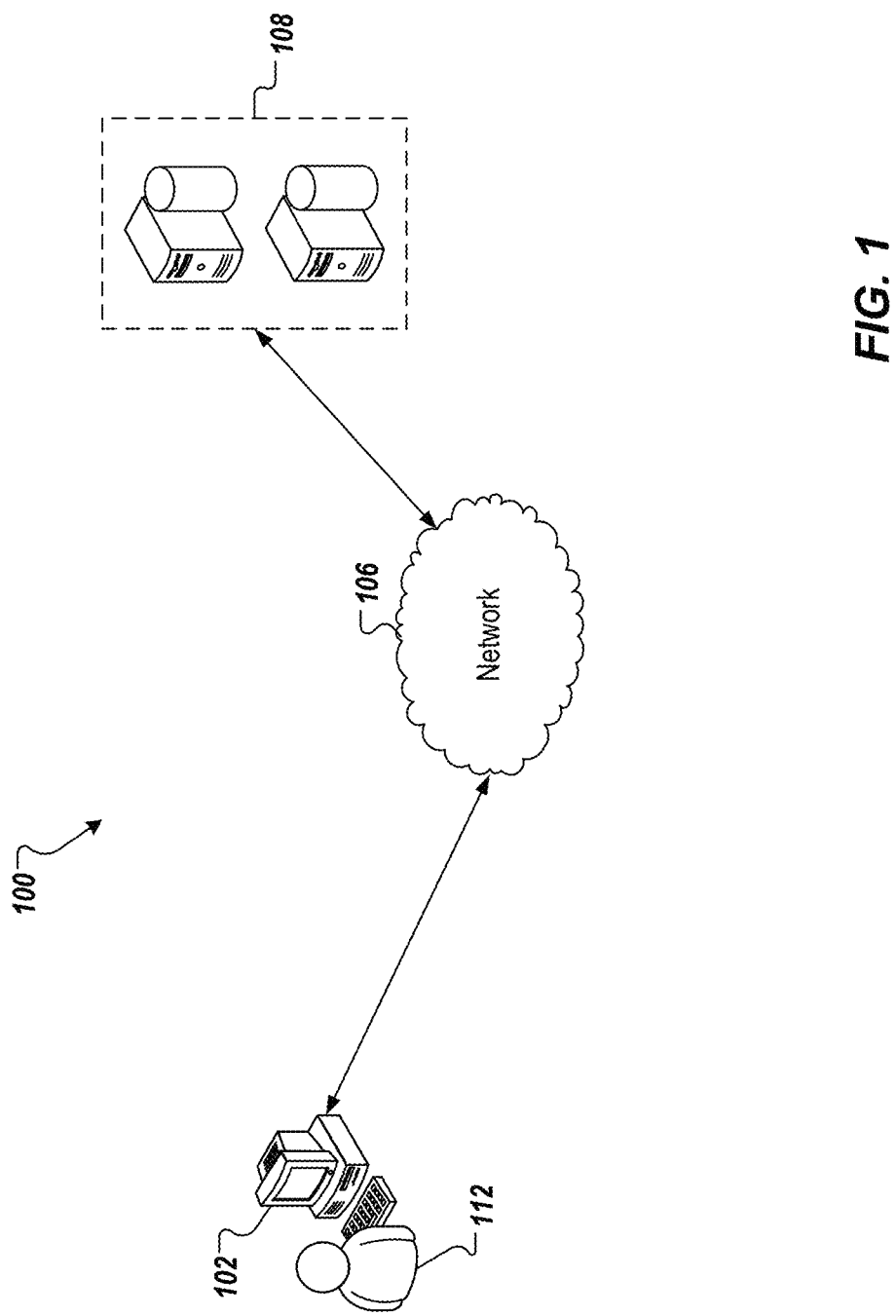
FIG. 1 depicts an example architecture that can be used to execute implementations of the present disclosure.

Implementations of the present disclosure are directed to vectorizing structured documents with multiple modalities to enable machine learning (ML) models to learn from training data more effectively and increase ML model performance. More particularly, implementations of the present disclosure are directed to a vectorization scheme for structured documents having multiple modalities, the vectorization scheme accounting for columns and column spacing within the structured documents to provide input vectors representative of data within the structured documents. Implementations of the present disclosure are also directed to combining the vectorization scheme with an attention mechanism that enables ML models to learn which part of the vector input are relevant for a prediction.

Implementations can include actions of receiving structured data including a set of columns and a set of rows, each column having a plurality of values, and each row representing a record including a set of values of the set of columns, determining, for each column, a column width defining a number of characters, providing, for each row, a set of padded values, each padded value corresponding to a column and including a value of the set of values and one or more padding characters, the value and the one or more padding values collectively having a length equal to a respective column width, defining a set of strings by, for each row, concatenating padded values in the set of padded values to provide a string, and training the ML model by providing, for each string in the set of strings, an embedding as an abstract representation of a record of a respective row and processing the embedding through an attention layer of the ML model.

Implementations of the present disclosure are described in further detail with reference to an example problem space that includes the domain of finance and matching bank statements to customer accounts. More particularly, implementations of the present disclosure are described with reference to the problem of, given a bank statement (e.g., a computer-readable electronic document recording data representative of one or more bank statements), enabling an autonomous system to determine one or more customer accounts that are represented in the bank statement using a ML model. It is contemplated, however, that implementations of the present disclosure can be realized in any appropriate problem space.

To provide further context for implementations of the present disclosure, and as introduced above, ML models can be used in a variety of problem spaces. An example problem space includes autonomous systems tasked with matching items of one entity to items of another entity. Examples include, without limitation, matching questions to answers, people to products, bank statements to invoices, and bank statements to customer accounts.

Numerous ML problems deal with learning patterns and insights from data. Typically, the goal of a ML model is to enable autonomous systems to execute tasks and improve efficiencies of processes. For example, and in the example domain of finance, autonomous systems can be used to match a bank statement to a set of invoices that are present in the financial system and reconcile automatically. Another use case is to identify an entity (e.g., a customer) that another entity (e.g., a particular bank statement) belongs to. This information is not provided by default. In the example domain of finance, this information can be required to identify customers that potentially belong to a particular bank statement. The problem statement for this use case can be described as: given an entity (e.g., bank statement), find the set of entities (e.g., customer accounts) that it belongs to. In these use cases, the term bank statement refers to a financial transaction (e.g., a payment (a check, a wire transfer) received for an invoice).

In training of an ML model, training data is typically vectorized to provide input vectors to be input to the ML model. Conventionally, vectorization of unstructured data, such as natural language input, includes defining a set of tokens (e.g., characters, words, sentences) and mapping each token to an embedding (a vector or an array of vectors). In some examples, each vector is of length d, where d is also referred to as the embedding size or dimension. Because of the sequential nature of natural language input, a vectorization of a series of tokens results in a matrix. Moreover, during training, ML models leverage sequence order (e.g., the order of words in text) to learn patterns and understand semantic relationships through the abstract representations. In other words, the embedding from the 'previous' dimension i of a vector array helps inform about the embedding of the next dimension i+1. Common ML models (e.g., long-short term memory (LSTM) networks, character convolutional neural networks (CNNs)) leverage this temporal dependency.

In the case of matching structured documents (e.g., bank statements to customer accounts), each column of a structured document can be considered a silo. That is, there is no meaning in the order of the columns. By way of non-limiting example, an example structured document can include columns of amount, memoline, and currency. For a record (e.g., a row representing a bank statement), the order of the columns provides no meaning. For example, it makes no difference whether the column for amount comes before or after the column for memoline. In view of this, any ML model trained on structured data should not alter its behavior significantly, even if the column orders are changed.

In handling structured documents, traditional training techniques have dealt with vectorization by concatenating the columns of the documents into one continuous string. Using the example columns of amount, memoline, and currency, and example values of [750], [For invoice 1234*], and [USD], respectively, an example traditional concatenation is provided as [750 For invoice 1234* USD]. In some instances, traditional training techniques can add one or more padding characters at the end of each concatenation to ensure that all of the concatenations are of equal length. For example, a length can be provided as 30 characters (including spaces). Consequently, and continuing with the example above, the example concatenation can be provided as [750 For invoice 1234* USD #####], where # is used as the padding character.

Conventional systems using concatenation of values across columns (with or without padding characters at the end) makes structured documents compatible with conventional ML models that deal with natural language text (unstructured data). However, this concatenation approach can introduce unwanted biases into the resulting ML model. An example bias includes training the ML model with the notion that column order matters, because the input representation (input embedding) is fully continuous.

In view of the above context, implementations of the present disclosure provide vectorizing of structured documents with multiple modalities to enable ML models to learn from structured data more effectively and improve ML model performance. More particularly, implementations of the present disclosure are directed to a vectorization scheme for structured documents having multiple modalities, the vectorization scheme accounting for columns and column spacing within the structured documents to provide input vectors representative of data within the structured documents. Implementations of the present disclosure are also directed to combining the vectorization scheme with an attention mechanism that enables ML models to learn which part of the vector input are relevant for a prediction.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statements), and can match electronic documents (e.g., a bank statement) to entities (e.g., customer accounts represented in data stored in a customer database). In some examples, the server system 104 includes a ML platform that provides and trains a ML model, as described herein.

In accordance with implementations of the present disclosure, and in the example problem space, the autonomous system uses the ML model to match a bank statement to a customer. Implementations of the present disclosure also provide a ML model as a neural network that includes an attention mechanism and processes input vectors that are generated as described herein.

In further detail, and as introduced above, implementations of the present disclosure provide a vectorization scheme to provide input vectors (embeddings) for processing through a ML model. As described herein, the vectorization scheme is used during training of the ML model to mitigate bias in the ML model. After training, the vectorization scheme is used in testing and/or production use of the ML model (e.g., use of the ML model in an autonomous system). The vectorization scheme of the present disclosure accounts for columns of structured documents having difference modalities and ensures that the values of each column have sufficient separation from other columns, such that the order of columns does not significantly impact the output of the ML model. In some examples, a modality refers to a data type (e.g., number, text, category, date).

In accordance with implementations of the present disclosure, the vectorization scheme includes column-wise padding. In some examples, the column-wise padding includes adding one or more padding characters between values of respective columns, when concatenating the column values. That is, one or more padding characters are provided after each column value, such that every column value has a specific, pre-defined length (e.g., length being determined as a number of characters including spaces). When turning the concatenated column values into embeddings, the padding characters are translated to zero vectors. In this manner, during training, the ML model accounts for (learns) natural boundaries between contiguous columns, thereby introducing a column-order invariance (i.e., column order not significantly affecting output of the ML model). In this manner, so-called cells are provided in the vectorization scheme to preserve the structured-ness of the original data provided in structured documents.

The vectorization scheme of the present disclosure can be formally described as follows. Given a structured document D (e.g., spreadsheet in .xls or .csv format), a set of columns C ($C=c_1, \ldots, c_n$; where n is the number of columns c) and respective column widths W ($W=w_1, \ldots, w_n$), and padding character (e.g., #), a vectorization function $f$ can be denoted as:

$$f(D)=\text{Concat}[g(c_1),g(c_2),\ldots,g(c_n)]$$

where $$g(c_i)=\text{Concat}[D(c_i),\text{Multiply}(\#,w_i-\text{length}(D(c_i)))]$$

and i is a counter (i.e., $1 \leq i \leq n$). In some examples, the widths W are each defined based on the maximum length (e.g., number of characters including spaces) of each column.

Figure 2:
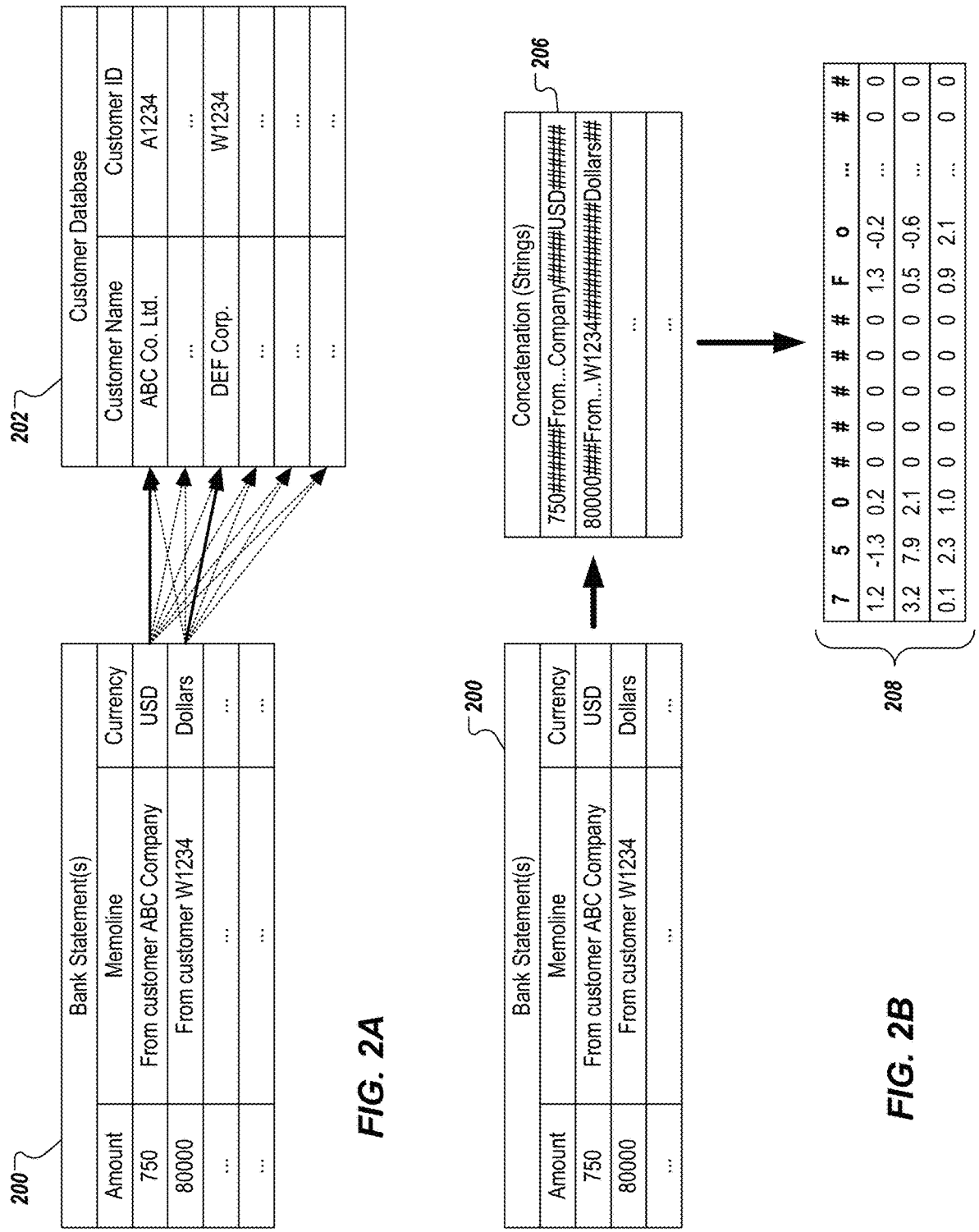
FIG. 2A depicts a graphical representation for identifying sets of entities as a matching problem in accordance with implementations of the present disclosure.
FIG. 2B depicts a graphical representation for an input representation flow in accordance with implementations of the present disclosure.

FIG. 2A depicts a graphical representation of sets of entities that are to be matched. In the example of FIG. 2A, bank statements 200 are to be matched to customer accounts 202 by a ML model. In accordance with implementations of the present disclosure, each bank statement 200 and customer account 202 is vectorized to provide respective input embeddings (e.g., vectors, vector arrays) for processing by the ML model. More particularly, each bank statement 200 and each customer account 202 is represented as a respective string (e.g., BS string, C string).

As depicted in FIG. 2A, bank statements and customer accounts are originally represented in tabular form in respective tables. Each bank statement is represented in a row of a bank statement table and each customer account is represented in a row of a customer table. In some implementations, for customer accounts, customer data (column values) provided in a row is concatenated to provide a customer string. For example, customer data can include a customer name and a customer identifier (ID) (e.g., an identifier uniquely identifying a respective customer within a financial system). In some examples, for bank statements, bank statement data (column values) provided in a row is concatenated to provide a bank statement string. For example, bank statement data can include amount, memoline, and currency. In this example, amount data are provided as number values, memoline data is provided as free-form text, and currency is provided as text.

In some implementations, each string is of a fixed length, where length is determined as a number of characters. In some examples, a space is also counted as a character (e.g., the string [Mr. Jones] has a length of 9 (characters)). In some examples, the length of the string can be determined based on a maximum length present within a dataset. In accordance with implementations, for each column in a structured document, a maximum length can be determined. For example, a length of each value in a column (i.e., all rows) is determined to identify the value having the most characters (i.e., longest length). In some examples, the maximum length for the particular column is set to the longest length.

Using the depiction of FIG. 2A as a non-limiting example, a set of columns can include $c_1$ (amount), $c_2$ (memoline), and $c_3$ (currency) and a set of widths can include $w_1=5$, $w_2=25$, and $w_3=7$ (i.e., the lengths of "80000," "From customer ABC Company," and "Dollars," respectively).

In some examples, a width of each column can be provided as the maximum length determined from the values of the respective columns plus a minimum padding length. In this manner, there is at least one padding character between concatenated column values.

In some examples, the minimum padding length is the same for all columns. Continuing with the example of FIG. 2A, and providing a minimum padding length of 5 for all columns, the set of width can include $w_1=10$, $w_2=30$, and $w_3=12$ (i.e., the lengths of "80000" plus 5, "From customer ABC Company" plus 5, and "Dollars" plus 5 respectively).

In some examples, the minimum padding length is column-specific. Continuing with the example of FIG. 2A, and providing minimum padding lengths of 5, 5, and 3 for $c_1$ (amount), $c_2$ (memoline), and $c_3$ (currency), respectively, the set of widths can include $w_1=10$, $w_2=30$, and $w_3=10$ (i.e., the lengths of "80000" plus 5, "From customer ABC Company" plus 5, and "Dollars" plus 3, respectively).

In the example of FIG. 2B, the following example bank statement strings 206 are provided:

750 #######From customer ABC Company #####USD #######

80000 #####From customer W1234 ############Dollars ###

Accordingly, and in some implementations, for each column of a structured document, a column width defining a number of characters is determined, and, for each row of the structured document, a set of padded values is provided. Each padded value corresponds to a column and includes a value of the set of values and one or more padding characters, the value and the one or more padding values collectively having a length equal to a respective column width. Using the examples above, a first set of padded values of a first row can be provided as:

750#######
From customer ABC Company #####
USD ####### and a second set of padded values of a second row can be provided as:

80000#####
From customer W1234############
Dollars ###

In accordance with implementations of the present disclosure, a set of strings is provided by, for each row, concatenating padded values in the set of padded values to provide a string. Continuing with the examples above, the first set of padded values can be concatenated to provide a first string:

750 #######From customer ABC Company #####USD ####### and the second set of padded values can be concatenated to provide the second string:

80000 #####From customer W1234############Dollars ###

In accordance with implementations of the present disclosure, the neural network converts each of the bank statement string and the customer string into a respective embedding. An embedding can be described as abstract representations of each character in a string. In some examples, the embedding includes one or more vectors (e.g., an array of vectors) that provide an abstract representation of the underlying string (e.g., bank statement string, customer string). In some examples, the neural network of the present disclosure includes an embedding layer that converts each string to a respective embedding. In some examples, embeddings can be provided by splitting a string into individual characters, mapping each character to a vector representative of the respective character, and concatenating the vectors to provide a two-dimensional matrix which represents the respective string.

FIG. 2B depicts an example embedding 208 (also referred to herein as a vector array) for a bank statement string provided from the example bank statement data. As depicted in FIG. 2B, for the padding characters the array of vectors include null values (0). That is, each padding character is represented as a vector of zeroes. More particularly, the embedding layer provides a vector representation of each character. In the example of FIG. 2B, the vector representation of the character 7 (non-padding character) is provided as [1.2, 3.2, 0.1] and the vector representation of the character 5 (non-padding character) is provided as [−1.3, 7.9, 2.3]. The vector representation of each of the padding characters # is provided as [0, 0, 0].

As introduced above, implementations of the present disclosure combine the vectorization scheme described herein with a ML model provided as a neural network having an attention mechanism (i.e., an attention layer). Attention, which is a mechanism that has become widely popular in natural language ML models, enables the ML model to learn which parts of a text is relevant for a particular task. In translation, for example, attention enables a ML model to focus on the context of a particular word or phrase that is to be translated, rather than unnecessarily making the ML model focus on the entire document/sentence to translate a single word.

In the example case of matching bank statements and customer accounts (or invoices), attention can be used to highlight which parts of the structured document (e.g., bank statement) are relevant to matching it to its counterpart (e.g., customer account). There are three inputs to the attention mechanism: query (Q), key (K), and value (V). Typically, in machine translation tasks, the query is the previous output of a decoder layer, and the key and values come from the output of the encoder layer. For matching entities in structured documents (e.g., matching bank statements to customer accounts), the query and the key are both an embedding of a structured document (e.g., both Q and K are the embedding 208 of FIG. 2B) and the value is an embedding of the other structured document.

Formally speaking, the attention mechanism can be expressed as:

$$\text{Attention}(Q, K, V) = \text{softmax}\left(\frac{QK^T}{\sqrt{d_k}}\right)V$$

where softmax( ) is a standard softmax activation unction, indicates a transposition and $d_k$ is the embedding size of the key (e.g., embedding of the bank statement). Intuitively speaking, the softmax( ) part produces a normalized probability vector, also referred to as a mask, which expresses which parts of V (e.g., embedding from customer table) are relevant for matching with the relevant parts of Q (e.g., embedding of the bank statement).

A notable difference between attention and other deep learning architectures, such as long-short term memories (LSTMs) and convolution neural networks (CNNs), is that attention does not introduce sequential computation or temporal dependencies. Instead, attention relies on the dot-products of the inputs (Q, K, V). Accordingly, it is possible for attention to highlight which parts of the bank statement/customer account are relevant for a match regardless of where the column is with respect to the positions of other columns.

In accordance with implementations of the present disclosure, for each bank statement (BS) and customer account (C) pair (e.g., BS-C pair), the respective bank statement embedding and the respective customer account embedding are compared by the neural network. As described herein, the neural network applies attention to compare the embedding (vector) inputs. For example, the neural network processes the bank statement embedding and the customer embedding using attention to determine a degree of match for the respective pair (i.e., bank statement and customer pair).

Intuitively, using attention, the neural network uses the respective embeddings to determine which parts of the bank statement string match with the customer string. The output of attention is a single vector that contains the results of these comparisons. In some examples, the single vector can be described as a consolidated result of comparing each token in string_1 (e.g., bank statement) to those of string_2 (e.g., customer account) and vice-versa.

In accordance with implementations of the present disclosure, the neural network further includes a fully-connected layer (also referred to herein as an activation layer) that processes the single vector output of the decomposable attention layer to provide a scalar confidence score (p). In some examples, the fully-connected layer includes a sigmoid activation function, the output of which is the scalar confidence score (p). More particularly, the sigmoid activation function converts the single vector to a value within a range (e.g., 0 to 1) and outputs the value as the scalar confidence score (p). More particularly, the sigmoid activation function converts the single vector to a value within a range (e.g., 0 to 1) and outputs the value as the scalar confidence score (p).

In some implementations, the scalar confidence score (p) indicates a probability of a match between the bank statement and the customer account represented in the respective BS-C pair. In some implementations, the scalar confidence score can be compared to a threshold score. If the scalar confidence score exceeds the threshold score, it is determined that the bank statement and the customer account of the respective BS-C pair match. If the scalar confidence score does not exceed the threshold score, it is determined that the bank statement and the customer account of the respective BS-C pair do not match.

In some implementations, the ML model is trained using training data. In the examples use case, the training data includes historical data of matches (positive samples) of bank statements and customer accounts (i.e., known matching bank statement and customer account (BS-C) pairs). In some examples, the training data includes mis-matches (negative samples) of bank statements and customer accounts. During training, the training data is vectorized using the vectorization scheme of the present disclosure and is provided as input to the ML model.

In the ML model, each layer includes a respective set of parameters (also referred to as weights) that affect the output of the respective layers. During training of the ML model, values of the parameters across the layers are iteratively changed in an effort to optimize a loss function (e.g., cross-entropy). In general, ML models are iteratively trained, where, at each iteration, a loss value is determined based on the loss function. The loss value represents a degree of accuracy of the output of the ML model. In general, the loss value can be described as a representation of a degree of difference (or distance) between the output of the ML model and an expected output of the ML model, the expected output being provided from validation data (e.g., data that includes expected outputs for known inputs). In some examples, if the loss value does not meet an expected value (e.g., 0), parameters of the ML model are adjusted, and another iteration of training is performed. In some instances, this process is repeated until the loss value meets the expected value.

By training the ML model using the vectorization scheme of the present disclosure, bias that would otherwise be introduced in the ML model is mitigated. That is, the vectorization scheme of the present disclosure enables the ML model to be trained with reduced focus on column order in structured documents. In this manner, the ML model accounts for (learns) natural boundaries between contiguous columns, thereby introducing a column-order invariance (i.e., column order not significantly affecting output of the ML model).

Figure 3:
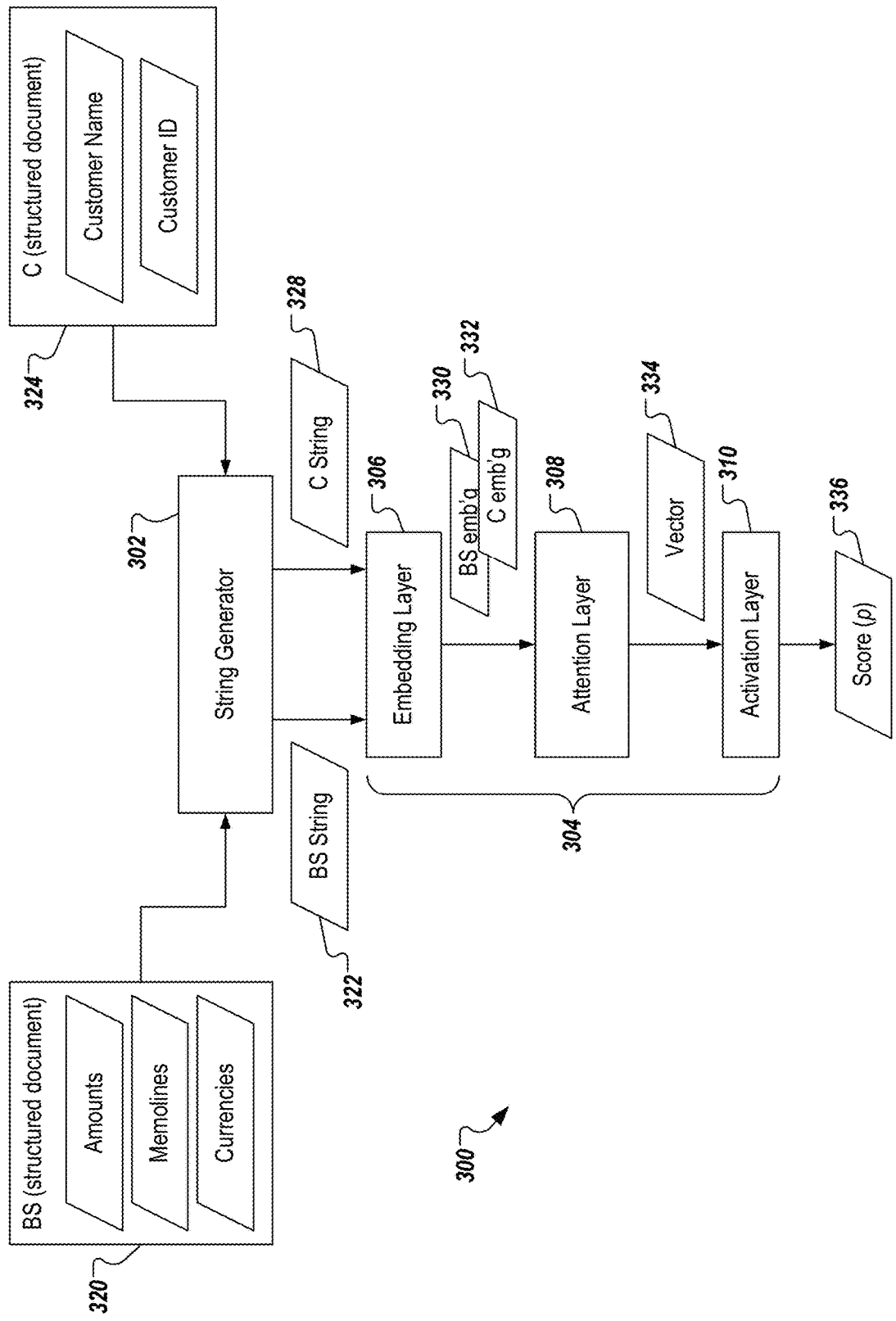
FIG. 3 depicts an example conceptual architecture in accordance with implementations of the present disclosure.

FIG. 3 depicts an example conceptual architecture 300 in accordance with implementations of the present disclosure. In the example of FIG. 3, the example conceptual architecture includes a string generator 302 and a ML model 304. In some examples, the string generator 302 and the ML model 304 can be executed as part of an autonomous system. As described herein, the ML model 304 is provided as a neural network that includes an embedding layer 306, an attention layer 308, and an activation layer 310.

In some implementations, for each bank statement 320, the string generator 302 receives bank statement data (e.g., amount, memoline, currency) and generates a bank statement (BS) string 322, as described herein (e.g., characters plus padding character(s)). In some implementations, for each customer account, the string generator 302 receives customer account data 324 (e.g., customer name, customer ID), and generates a customer (C) string 328, as described herein (e.g., concatenation of customer name characters plus column-wise padding character(s) and customer ID characters plus column-wise padding character(s)). The BS strings 322 for all bank statements that are to be considered and the C strings 328 for all customer accounts that are to be considered are provided for processing by the neural network 304. In some examples, BS string 322 and C string 328 pairs for respective BS-C pairs are incrementally provided to the neural network 304 for processing, as described herein.

In some implementations, for each BS string 322 and C string 328 pair the embedding layer 306 provides a BS string embedding 330 and a C string embedding 332, as described herein. The attention layer 308 processes the BS embedding 330 and the C embedding 332 to provide the single vector 334, as described herein. The activation layer 310 processes the single vector 334 through a sigmoid activation function, as described herein, to provide a scalar confidence score (p) 336 for the respective BS-C pair. The scalar confidence score (p) is used as described herein to determine whether the bank statement and the customer account of the respective BS-C pair are a match.

Figure 4:
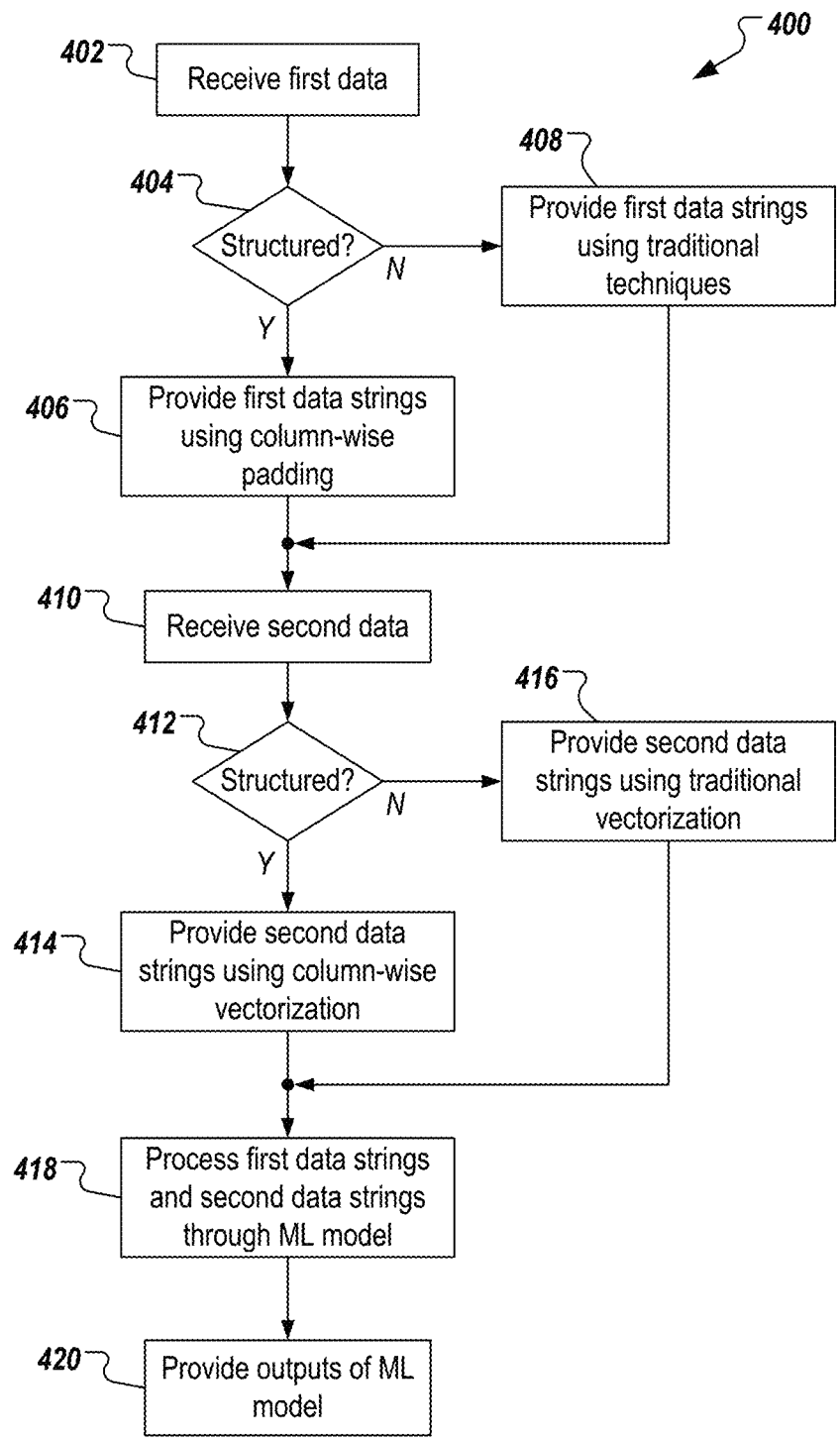
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 is executed by an autonomous system that is tasked with, in the example use case, matching bank statements to customer accounts.

First data is received (402). For example, and in the example use case, the autonomous system receives first data representing bank statements that are to be matched to customer accounts. It is determined whether the first data is structured data (404). For example, a file format of the first data can be determined, and, if the file format is a file storing structured data, the first data can be determined to be structured data. Example file formats for files storing structured data include, without limitation, .xls and .csv file formats.

If the first data is structured data, first data strings are provided using column-wise padding in accordance with implementations of the present disclosure (406). For example, and as described herein, a first data string is provided for each record (e.g., each row) in the first data. More particularly, and as described herein, a column width is determined for each column in the first data. In some examples, the column-width is determined by identifying a column value having the longest length (e.g., the value having the highest number of characters) and adding a pre-defined number of characters to the longest length. In some examples, each of the first data strings is provided by taking a value of each column, adding one or more padding characters (e.g., #) to the end of the value, such that the value plus padding character(s) equals the column-width, and concatenating with the value plus padding character(s) of one or more other columns in the first data.

If the first data is not structured data, first data strings are provided using traditional techniques (408). For example, the first data can include natural language data and the first data string is provided as a continuous string of text.

Second data is received (410). For example, and in the example use case, the autonomous system receives second data representing customer accounts that are to be matched to bank statements. It is determined whether the second data is structured data (412). For example, a file format of the second data can be determined, and, if the file format is a file storing structured data, the second data can be determined to be structured data. Example file formats for files storing structured data include, without limitation, .xls and .csv file formats.

If the second data is structured data, second data strings are provided using column-wise padding in accordance with implementations of the present disclosure (414). For example, and as described herein, a second data string is provided for each record (e.g., each row) in the second data. More particularly, and as described herein, a column width is determined for each column in the second data. In some examples, the column-width is determined by identifying a column value having the longest length (e.g., the value having the highest number of characters) and adding a pre-defined number of characters to the longest length. In some examples, each of the second data strings is provided by taking a value of each column, adding one or more padding characters (e.g., #) to the end of the value, such that the value plus padding character(s) equals the column-width, and concatenating with the value plus padding character(s) of one or more other columns in the second data.

If the second data is not structured data, second data strings are provided using traditional techniques (416). For example, the second data can include natural language data and the second data string is provided as a continuous string of text.

The first data strings and the second data strings are processed through the ML model (418) and outputs are provided (420). For example, and as described herein, various pairs of first data strings and second data strings (e.g., BS-C pairs) are provided as input to the ML model. In some examples, an embedding layer of the ML model (e.g., the embedding layer 306 of FIG. 3) provides respective embeddings for each of the first data string and the second data string. In accordance with implementations of the present disclosure, for data strings of structured data, the embeddings include zero vectors representing the padding characters (e.g., as depicted in the example embedding 208 of FIG. 2B). The embeddings are processed through an attention layer (e.g., the attention layer 308), which provides a single vector (e.g., the single vector 334). An activation layer (e.g., the activation layer 310) processes the single vector through an activation function (e.g., a sigmoid activation function) to provide the output (e.g., the scalar confidence score (p) 336) for a respective first data-second data pair (e.g., BS-C pair).

Figure 5:
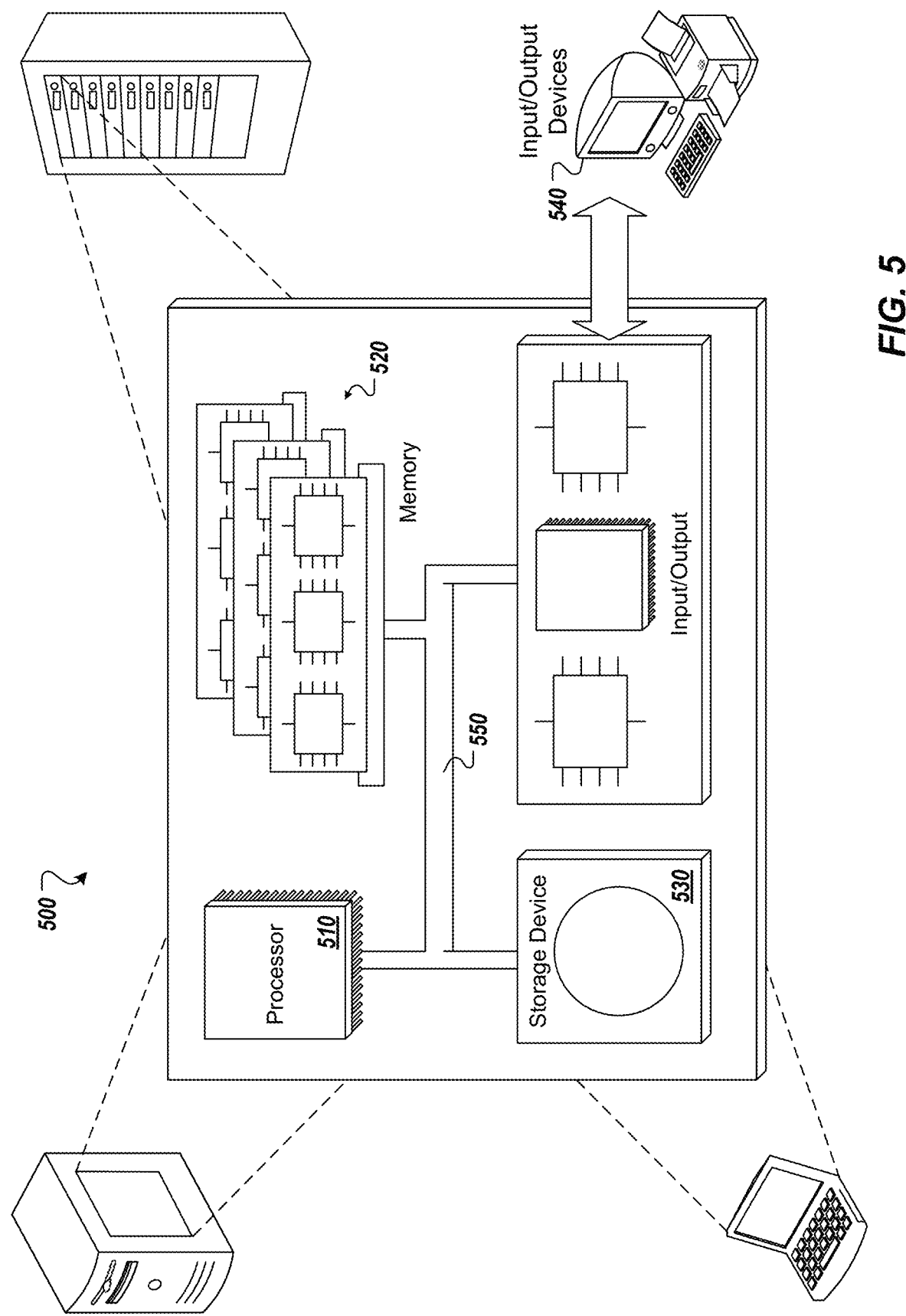
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for training a machine learning (ML) model, the method being executed by one or more processors and comprising:
   receiving structured data comprising a set of columns and a set of rows, each column having a plurality of values, and each row representing a record comprising a set of values of the set of columns;
   determining, for each column, a column width defining a number of characters;
   providing, for each row, a set of padded values, each padded value corresponding to a column and comprising a value of the set of values and one or more padding characters, the value and the one or more padding values collectively having a length equal to a respective column width;
   defining a set of strings by, for each row, concatenating padded values in the set of padded values to provide a string; and
   training the ML model by providing, for each string in the set of strings, an embedding comprising an abstract representation of a record of a respective row and processing the embedding through an attention layer of the ML model.

2. The method of claim 1, wherein a first column in the set of columns comprises values of a first data type and a second column in the set of columns comprises values of a second data type, the second data type being different from the first data type.

3. The method of claim 1, wherein, for a respective row, a first padded value is provided having a first number of characters and a second padded value is provided having a second number of characters, the second number of characters being different than the first number of characters.

4. The method of claim 1, wherein each embedding comprises a zero vector as an abstract representation of a padding character.

5. The method of claim 1, wherein each embedding comprises a non-zero vector as an abstract representation of a non-padding character.

6. The method of claim 1, wherein the ML model is unbiased with respect to an order of columns.

7. The method of claim 1, wherein the structured document comprises data representative of bank statements that are to be matched to customer accounts by the ML model.

8. A non-transitory computer-readable storage medium coupled to one or more processors and having instructions stored thereon which, when executed by the one or more processors, cause the one or more processors to perform operations for training a machine learning (ML) model, the operations comprising:

receiving structured data comprising a set of columns and a set of rows, each column having a plurality of values, and each row representing a record comprising a set of values of the set of columns;

determining, for each column, a column width defining a number of characters;

providing, for each row, a set of padded values, each padded value corresponding to a column and comprising a value of the set of values and one or more padding characters, the value and the one or more padding values collectively having a length equal to a respective column width;

defining a set of strings by, for each row, concatenating padded values in the set of padded values to provide a string; and training the ML model by providing, for each string in the set of strings, an embedding comprising an abstract representation of a record of a respective row and processing the embedding through an attention layer of the ML model.

9. The computer-readable storage medium of claim 8, wherein a first column in the set of columns comprises values of a first data type and a second column in the set of columns comprises values of a second data type, the second data type being different from the first data type.

10. The computer-readable storage medium of claim 8, wherein, for a respective row, a first padded value is provided having a first number of characters and a second padded value is provided having a second number of characters, the second number of characters being different than the first number of characters.

11. The computer-readable storage medium of claim 8, wherein each embedding comprises a zero vector as an abstract representation of a padding character.

12. The computer-readable storage medium of claim 8, wherein each embedding comprises a non-zero vector as an abstract representation of a non-padding character.

13. The computer-readable storage medium of claim 8, wherein the ML model is unbiased with respect to an order of columns.

14. The computer-readable storage medium of claim 8, wherein the structured document comprises data representative of bank statements that are to be matched to customer accounts by the ML model.

15. A system, comprising:
a computing device; and
a computer-readable storage device coupled to the computing device and having instructions stored thereon which, when executed by the computing device, cause the computing device to perform operations for natural language explanations for training a machine learning (ML) model, the operations comprising:

receiving structured data comprising a set of columns and a set of rows, each column having a plurality of values, and each row representing a record comprising a set of values of the set of columns;

determining, for each column, a column width defining a number of characters;

providing, for each row, a set of padded values, each padded value corresponding to a column and comprising a value of the set of values and one or more padding characters, the value and the one or more padding values collectively having a length equal to a respective column width;

defining a set of strings by, for each row, concatenating padded values in the set of padded values to provide a string; and training the ML model by providing, for each string in the set of strings, an embedding comprising an abstract representation of a record of a respective row and processing the embedding through an attention layer of the ML model.

16. The system of claim 15, wherein a first column in the set of columns comprises values of a first data type and a second column in the set of columns comprises values of a second data type, the second data type being different from the first data type.

17. The system of claim 15, wherein, for a respective row, a first padded value is provided having a first number of characters and a second padded value is provided having a second number of characters, the second number of characters being different than the first number of characters.

18. The system of claim 15, wherein each embedding comprises a zero vector as an abstract representation of a padding character.

19. The system of claim 15, wherein each embedding comprises a non-zero vector as an abstract representation of a non-padding character.

20. The system of claim 15, wherein the ML model is unbiased with respect to an order of columns.

* * * * *